United States Patent
Yamaguchi et al.

(10) Patent No.: US 9,065,374 B2
(45) Date of Patent: Jun. 23, 2015

(54) INVERTER CONTROL SYSTEM

(75) Inventors: Takashi Yamaguchi, Tokyo (JP); Toru Kakebayashi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 162 days.

(21) Appl. No.: 13/978,589

(22) PCT Filed: Jan. 11, 2012

(86) PCT No.: PCT/JP2012/050319
§ 371 (c)(1),
(2), (4) Date: Jul. 8, 2013

(87) PCT Pub. No.: WO2012/096274
PCT Pub. Date: Jul. 19, 2012

(65) Prior Publication Data
US 2013/0278189 A1    Oct. 24, 2013

(30) Foreign Application Priority Data

Jan. 12, 2011    (JP) ................................ 2011-003799

(51) Int. Cl.
| | |
|---|---|
| H02P 21/00 | (2006.01) |
| H02M 7/5387 | (2007.01) |
| H02P 27/08 | (2006.01) |
| H02P 6/18 | (2006.01) |
| H02P 23/00 | (2006.01) |

(52) U.S. Cl.
CPC ....... *H02P 21/0085* (2013.01); *H02M 7/53875* (2013.01); *H02P 27/08* (2013.01); *H02P 2201/07* (2013.01); *H02P 2205/01* (2013.01); *H02P 6/182* (2013.01); *H02P 23/0086* (2013.01)

(58) Field of Classification Search
CPC .................................................. H02P 21/0085
USPC ................................ 318/400.02, 400.01, 700
See application file for complete search history.

(56) References Cited

U.S. PATENT DOCUMENTS

| | | | |
|---|---|---|---|
| 5,038,092 A | * | 8/1991 | Asano et al. .................. 318/811 |
| 2009/0174350 A1 | | 7/2009 | Kuroda et al. |
| 2011/0035108 A1 | | 2/2011 | Yamashita |

FOREIGN PATENT DOCUMENTS

| | | |
|---|---|---|
| JP | 05-260787 A | 10/1993 |
| JP | 2006-104781 A | 4/2006 |
| JP | 2009-124871 A | 6/2009 |
| JP | 2009-165298 A | 7/2009 |
| JP | 2009-248857 A | 10/2009 |
| JP | 2009-254107 A | 10/2009 |

OTHER PUBLICATIONS

Yosuke Takata, Toshihiko Noguchi, Yukio Yamashita, Yoshimi Komatsu, and Seiichi Ibaraki "220000r/min-2kW PM Motor Drive System for Turbocharger" 2004 IEE—Japan Industry Applications Society Conference, pp. 155-160.

* cited by examiner

*Primary Examiner* — David S Luo
(74) *Attorney, Agent, or Firm* — Foley & Lardner LLP

(57) ABSTRACT

A LPF extracts DC component of a current detection value of an inverter input current. A subtracting section 4 calculates a difference between a current command value and the DC component of the current detection value. A current controller 5 produces two-phase PWM signals Sa and Sb complementary to each other, from the current difference. Further, an integrating circuit 7 integrates output terminal voltages Vu, Vv and Vw of the inverter to convert the output terminal voltages Vu, Vv and Vw into a magnetic-flux information Φu, Φv and Φw. A logic conversion section 8 converts the magnetic-flux information Φu, Φv and Φw into 120-degree conduction patterns S1'-S6' to output the 120-degree conduction patterns S1'-S6'. Then, a logic circuit section 9 executes a logic synthesis between the PWM signals Sa and Sb and the 120-degree conduction patterns S1'-S6' to output gate signals S1-S6.

5 Claims, 5 Drawing Sheets

INVERTER CONTROL SYSTEM

TECHNICAL FIELD

The present invention relates to a sensorless control and a control system for 120-degree-conduction-type PWM inverter.

BACKGROUND ART

Generally, a voltage-source PWM method is used as an inverter control for driving a PM motor. In many cases, a vector control is applied to a current control of the motor, for the purpose of controlling a current waveform into a sine wave and thereby suppressing harmonics resulting in enabling a smooth control of the PM motor.

Moreover, in many cases, a sensorless method is used for detecting a magnetic-pole position of the PM motor. In this sensorless method, in general, a terminal voltage of the motor is taken into a CPU by analog-digital conversion and the like so that the magnetic-pole position is detected.

The motor current control and the sensorless method require a high arithmetic load (computational load) of the CPU, and hence, a computing period (cycle) needs to be sufficiently high-speed with respect to a rotational period of the motor. Moreover, since the computing period becomes higher in speed as a motor rotational speed becomes higher, it is difficult to adopt the above-mentioned method (the motor current control and the sensorless method) in a control for ultra-high-speed motor (having hundreds of thousands of rotations $min^{-1}$).

A bottleneck of this problem is a computing-capacity limit of an arithmetic unit (computing unit) relative to the control method. It is said that about one hundred thousand rotations $min^{-1}$ is a limit in consideration for computing capacity and analog-to-digital conversion time of an existing CPU.

As a countermeasure against this problem, Patent Literature 1 discloses a 120-degree-conduction pseudo-current-source inverter adopting the sensorless method. FIG. 8 is a configuration view showing a main circuit of the pseudo-current-source inverter whose input is a DC power source (this FIG. 8 is equivalent to a structure of Patent Literature 1 when regarding the DC power source as a diode bridge circuit in an input portion of FIG. 1 of Patent Literature 1). For comparison, FIG. 9 shows a main circuit configuration of a general voltage-source inverter. The pseudo-current-source inverter (FIG. 8) disclosed in Patent Literature 1 includes an additional voltage-drop circuit 2 as compared with the general voltage-source inverter shown in FIG. 9. The voltage-drop circuit 2 is constituted by a transistor FET 1, diodes D1 and D2, and a reactor L1.

In a control method for the pseudo-current-source inverter in Patent Literature 1, a 120-degree-conduction rectangular wave is given as the motor current, and then, an influent peak-current is controlled by the voltage-drop circuit 2. Because a controlled object is DC current that is flowing in the reactor L1, the control period (cycle) is not restricted to a high frequency of ultra-high-speed motor. By virtue of such a control method, the arithmetic load of the CPU which causes the above-mentioned problem in the case of ultra-high-speed motor can be reduced to enable the control for the ultra-high-speed motor.

However, although the pseudo-current-source inverter shown in FIG. 8 realizes the control for ultra-high-speed motor, the pseudo-current-source inverter shown in FIG. 8 needs the additional devices (transistor FET1, diodes D1 and D2, reactor L1) constituting the voltage-drop circuit 2. Further, a wire circuit for connecting these additional devices is complicated. As a result, the pseudo-current-source inverter has a disadvantageous structure as a whole of motor drive system, from viewpoints of size, cost and loss.

Recently, an inverter has been strongly required to attain cost reduction, downsizing and loss reduction. Particularly, in a case that the inverter is used in a very-limited installation space such as vehicle installation, the pseudo-current-source inverter shown in FIG. 8 renders prominent the disadvantage of large size so that it is difficult to install the inverter.

It is therefore an object of the present invention to provide an inverter control system devised to realize low arithmetic load and reduction in size, cost and loss.

CITATION LIST

Patent Literature

Patent Literature 1: Japanese Patent Application Publication No. 05-260787

Patent Literature 2: Japanese Patent Application Publication No. 2009-165298

Non Patent Literature

Non Patent Literature 1: Yosuke Takata, Toshihiko Noguchi, Yukio Yamashita, Yoshimi Komatsu, and Seiichi Ibaraki "220000r/min-2 kW PM Motor Drive System for Turbocharger" 2004 IEE-Japan Industry Applications Society Conference

SUMMARY OF THE INVENTION

The present invention is produced in consideration of the above problem. According to one aspect of the present invention, there is provided an inverter control system comprising a controller configured to output a gate signal to a switching element provided in an inverter, the gate signal being produced based on an output terminal voltage of the inverter, an input current of the inverter and a current command value, the controller including: a low pass filter configured to extract a DC component from a current detection value of the input current of the inverter; a subtracting section configured to calculate a current difference between the current command value and the DC component of the current detection value; a current controller configured to produce two-phase PWM signals complementary to each other, from the current difference; an integrating circuit configured to integrate the output terminal voltage of the inverter to convert the output terminal voltage into a magnetic-flux information; a logic conversion section configured to convert the magnetic-flux information into a 120-degree conduction pattern to output the 120-degree conduction pattern; and a logic circuit section configured to execute a logic synthesis between the two-phase PWM signals and the 120-degree conduction pattern to output the gate signal.

According to another aspect of the present invention, there is provided the inverter control system, wherein the controller further includes: a speed detector configured to convert the 120-degree conduction pattern into a speed detection value; a subtracting section configured to calculate a speed difference between the speed detection value and a speed command value which is an input command; and a speed control section configured to calculate the current command value from the speed difference.

According to still another aspect of the present invention, there is provided the inverter control system, wherein the controller further includes: an electric-power detector configured to calculate an electric-power detection value by multiplying the DC component of the current detection value by a detection value of an input voltage of the inverter; a subtracting section configured to calculate an electric-power difference between the electric-power detection value and an electric-power command value which is an input command; and an electric-power control section configured to calculate the current command value from the electric-power difference.

According to still another aspect of the present invention, there is provided the inverter control system, wherein the controller further includes: a speed detector configured to convert the 120-degree conduction pattern into a speed detection value; a torque detector configured to calculate a torque detection value from the DC component of the current detection value, the speed detection value and a detection value of an input voltage of the inverter; a subtracting section configured to calculate a torque difference between the torque detection value and a torque command value which is an input command; and a torque control section configured to calculate the current command value from the torque difference.

Moreover, the integrating circuit and the logic conversion section may be constructed by an analog circuit.

According to the present invention, an inverter control system can be provided that is devised to realize low arithmetic load and reduction in size, cost and loss.

DESCRIPTION OF EMBODIMENTS

[First Embodiment]

An inverter control system in a first embodiment according to the present invention will now be explained referring to FIGS. 1 to 4. The inverter control system in the first embodiment includes a main circuit 1C and a current-control controller 3a.

Figure 1:
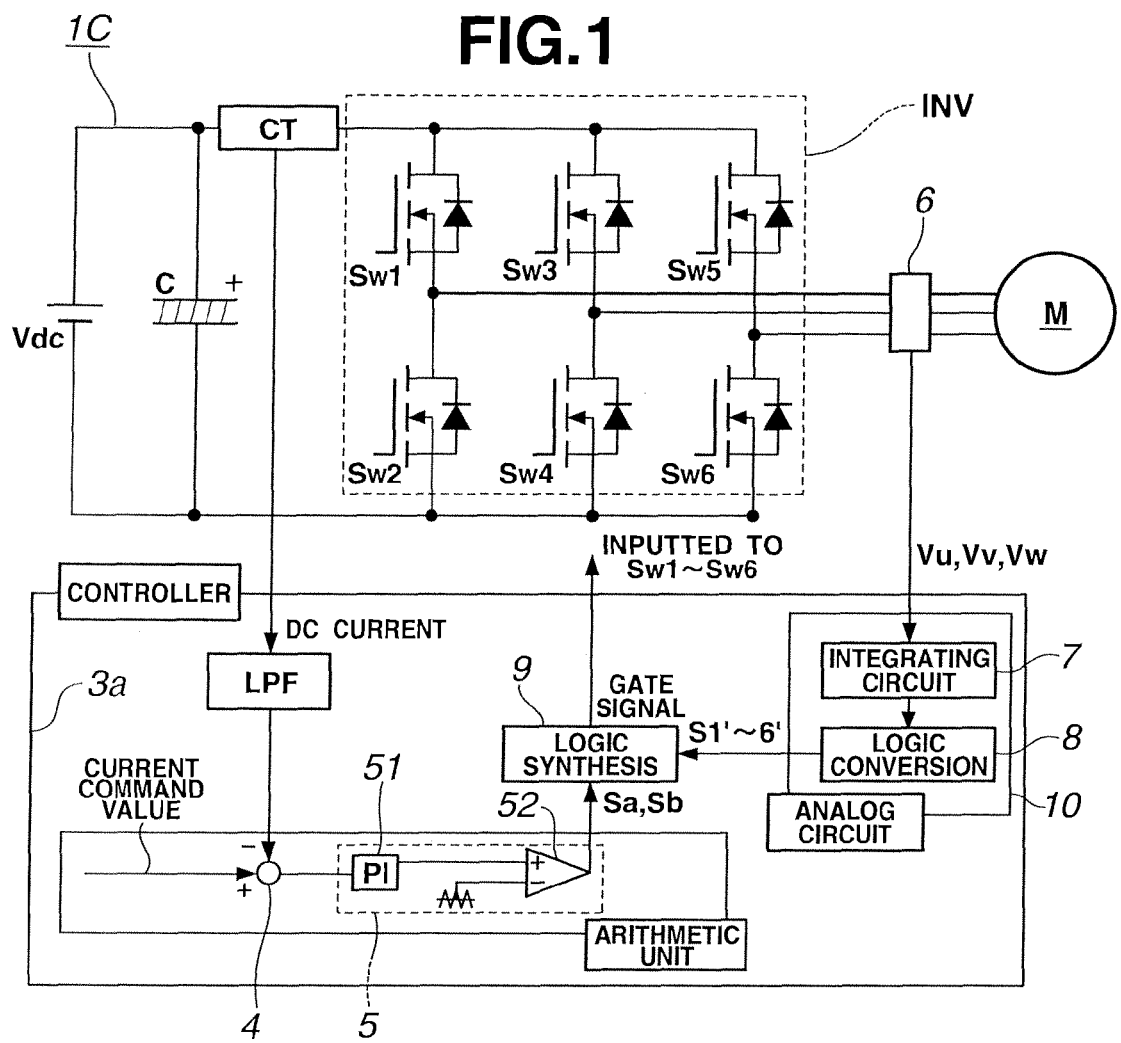
[FIG. 1] A configuration view showing an inverter control system in a first embodiment according to the present invention.

As shown in FIG. 1, the main circuit 1C in the first embodiment is constructed in the same manner as a general voltage-source PWM (pulse-width-modulation) inverter, and includes an inverter INV having a three-phase and six-element circuit. In this embodiment, a controlled object (i.e., a variable which is mainly used for the control) is an electric-current which is inputted to the inverter INV. Direct current (the input current of inverter) between a smoothing condenser C and switching elements Sw1 to Sw6 (i.e., between the smoothing condenser C and the inverter INV) is detected or obtained by a current sensor CT or the like. As the current sensor CT, any component that can detect or obtain the current value is able to be employed. For example, a component constituted by a shunt resistance or the like may be employed as the current sensor CT.

In the case of FIG. 1, the smoothing condenser C is provided for reducing an input noise. However, the smoothing condenser C can be omitted.

The current-control controller 3a controls a rotation of a motor M, by using the current detection value obtained by the current sensor CT, as the controlled object. A current waveform of the current detection value(s) is in a rectangular-wave shape. This rectangular-wave-shaped current detection value(s) is passed through a LPF (Low Pass Filter), and thereby, a DC (direct-current) component of the rectangular-wave-shaped current detection value(s) is extracted. A frequency of this rectangular-wave shape is the same as a PWM frequency of the inverter INV constituted by the switching elements Sw1 to Sw6. Hence, a cutoff frequency of the LPF is set based on the PWM frequency.

Figure 2:
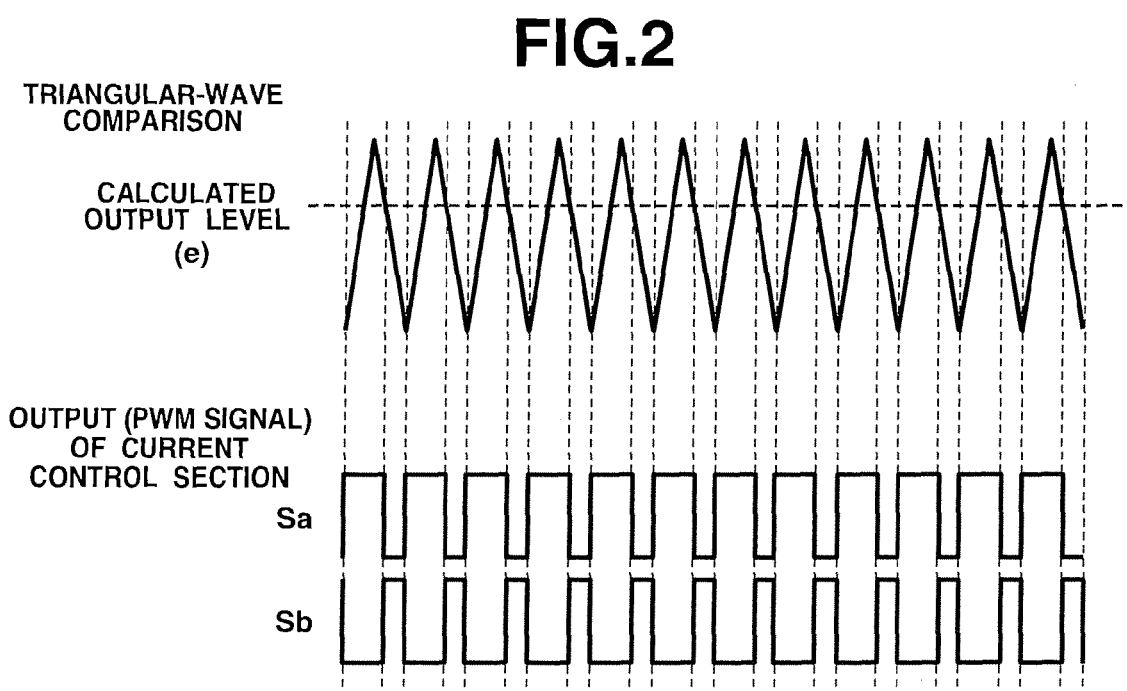
[FIG. 2] A waveform view showing triangular and PWM signals in the first embodiment.

A subtracting section 4 calculates a current difference between a current command value and the DC component of the current detection value outputted from the LPF. The current command value denotes an input command. Then, the subtracting section 4 inputs the current difference to a current control section (current controller) 5. The current control section 5 includes a PI controller 51 and a comparator 52. The PI controller 51 applies a PI (proportional-integral) operation to the current difference. The comparator 52 compares the output of the PI controller 51 with a reference signal having a predetermined frequency (for example, a triangular wave as shown in FIG. 2), and thereby, produces a two-phase signal including PWM signals Sa and Sb which are complementary (complementary symmetry) to each other as shown in FIG. 2. The subtracting section 4 and the current control section 5 are constructed in an arithmetic unit (such as CPU).

Figure 3:
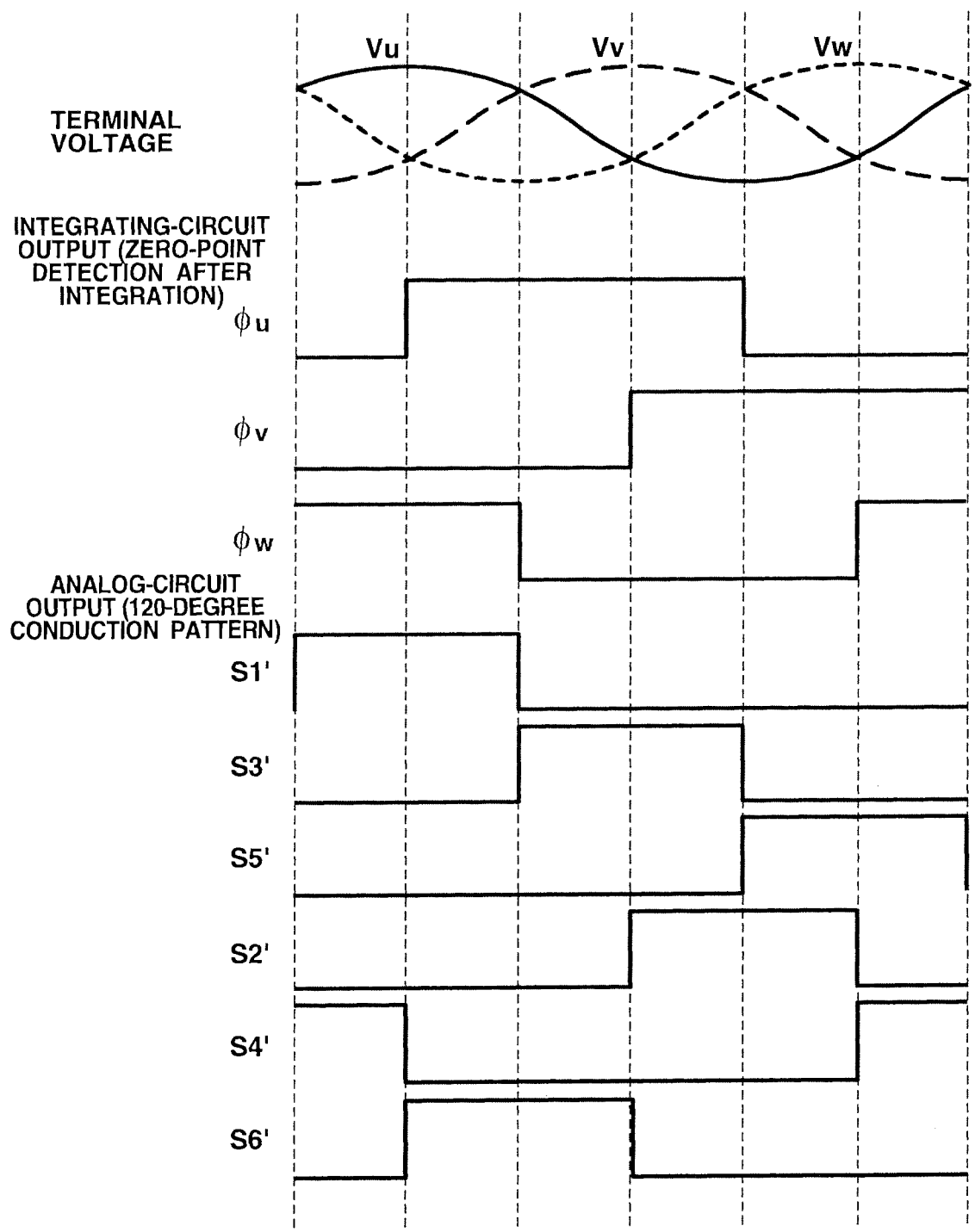
[FIG. 3] A view showing respective output waveforms of the inverter control system in the first embodiment.

Moreover, in order to perform a sensorless control for the motor M, output terminal voltages Vu, Vv and Vw of the invertor INV are detected or obtained by a voltage detector 6 as shown in FIG. 3. The terminal voltages Vu, Vv and Vw correspond to inductive voltages of the motor M. A sensorless circuit 10 converts these terminal voltages Vu, Vv and Vw into 120-degree conduction patterns S1', S2', S3', S4' S5' and S6'. That is, at first, the terminal voltages Vu, Vv and Vw are integrated by an integrating circuit 7, and thereby, are converted into magnetic-flux information $\phi u$, $\phi v$ and $\phi w$ as shown in FIG. 3. Next, these magnetic-flux information $\phi u$, $\phi v$ and $\phi w$ is converted into the 120-degree conduction patterns S1' to S6' by means of logic conversion in a logic conversion section 8. The logic conversion section 8 outputs the 120-degree conduction patterns S1' to S6' as shown in FIG. 3. The sensorless circuit 10 (including the integrating circuit 7 and the logic conversion section 8) is constructed by an analog circuit for the purpose of reducing an arithmetic load (computational load).

Figure 4:
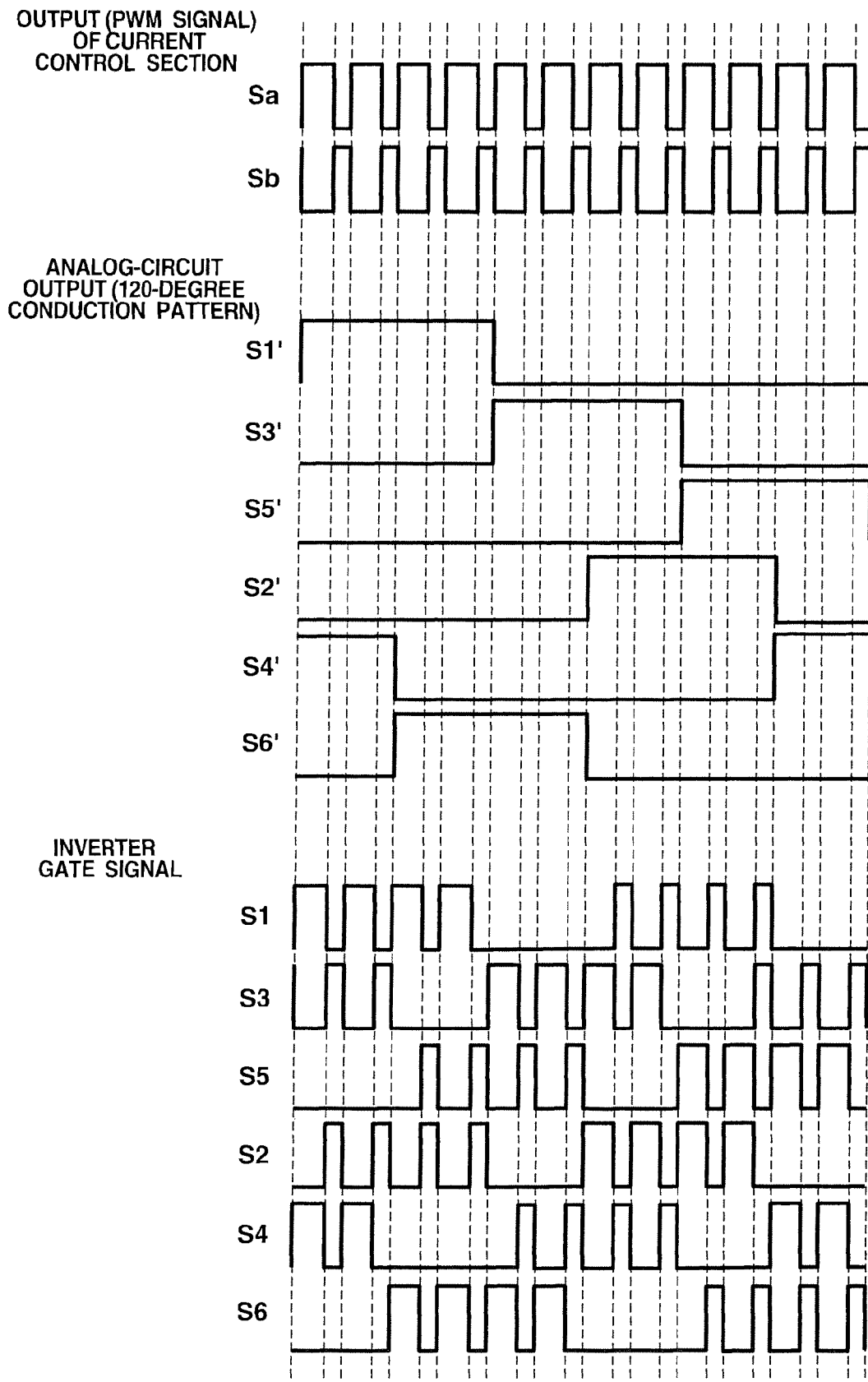
[FIG. 4] A view showing respective output waveforms of the inverter control system in the first embodiment.

Next, a logic synthesis section 9 executes a logic synthesis between the 120-degree conduction patterns S1' to S6' and the PWM signals Sa and Sb (the two-phase signal), and thereby produces inverter gate signals S1 to S6 as shown in FIG. 4.

The logic synthesis is executed by the following expressions (1) to (6). Herein, "&" in the expressions (1) to (6) denotes a logical AND operator, and "I" in the expressions (1) to (6) denotes a logical OR operator. Moreover, Sx' in the expressions (1) to (6) denotes the output signals of the 120-degree conduction patterns corresponding to the respective switching elements.

[Formula 1]

$$S1=(S1'\&Sa)|(S2'\&Sb) \quad (1)$$

$$S2=(S2'\&Sa)|(S1'\&Sb) \quad (2)$$

$$S3=(S3'\&Sa)|(S4'\&Sb) \quad (3)$$

$$S4=(S4'\&Sa)|(S3'\&Sb) \quad (4)$$

$$S5=(S5'\&Sa)|(S6'\&Sb) \quad (5)$$

$$S6=(S6'\&Sa)|(S5'\&Sb) \quad (6)$$

Then, the switching elements Sw1 to Sw6 constituting the inverter INV are controlled by the inverter gate signals S1 to S6 obtained by the expressions (1) to (6). Thereby, the motor M is driven.

As explained above, the inverter control system according to the first embodiment uses the analog circuit for a sensorless phase detection (frequency control), and the arithmetic unit (such as CPU) executes a control only for the DC component outputted from the LPF. Hence, an arithmetic amount of the current control section 5 is very small, resulting in a reduction of arithmetic load. Accordingly, the inverter control system according to the first embodiment is applicable to an ultra high-speed motor. Moreover, in the first embodiment, the reduction of arithmetic load is realized while using the versatile (generally-used) main circuit 1C as shown in FIG. 1. Therefore, the problem of Patent Literature 1 is not incurred that the devices (transistor FET1, diodes D1 and D2, reactor L1) constituting the voltage-drop circuit 2 are additionally provided. As a result, the inverter control system according to the first embodiment can reduce the arithmetic load while achieving downsizing and cost reduction.

Moreover, in a field of current control of an inverter, in general, electric current of the motor is detected as the controlled object (control target) for the current control. However, a high-speed analog-digital conversion ability and a high-speed arithmetic ability are necessary to detect and control a high-frequency current waveform of ultra high-speed motor. Hence, in the case of ultra high-speed motor, an extremely-expensive arithmetic unit (computing unit) is necessary. Contrary to this, the inverter control system according to the first embodiment performs the current control by regarding the DC component of the input direct current passed through the LPF, as the controlled object (control target). Hence, the current control of inverter can be properly performed irrespective of the high frequency of the ultra high-speed motor.

Regarding the PWM logical operation, the Patent Literature 2 also discloses a 120-degree-conduction PWM waveform. However, in the technique of Patent Literature 2, an output waveform is switched every 60 degrees. Hence, in the case of usage for the high-frequency wave of ultra high-speed motor, the arithmetic load is large so that there is a possibility that the control of ultra high-speed motor is impossible. Contrary to this, in the first embodiment according to the present invention, the logic synthesis is executed from the 120-degree conduction patterns S1' to S6' and the PWM signals Sa and Sb outputted from the current control section 5, only by means of simple logical operations. Accordingly, the arithmetic load is remarkably low. Therefore, the inverter control system according to the first embodiment is suited for the usage for the high-frequency wave of ultra high-speed motor.

As mentioned above, in the case of ultra high-speed motor, a general voltage-source PWM control cannot achieve the control of the ultra high-speed motor due to the increase of arithmetic load. Contrary to this, the arithmetic load of the inverter control system according to the first embodiment is low, and hence, the control of ultra high-speed motor can be achieved even if a low-performance and low-price arithmetic unit (CPU) is used. Moreover, since the main circuit 1C of the first embodiment is constructed in the same manner as the general voltage-source PWM method, the inverter control system according to the first embodiment can be realized by using relatively small-sized, low-cost and low-loss devices even in the case of usage for the ultra high-speed motor.

[Second Embodiment]

Figure 5:
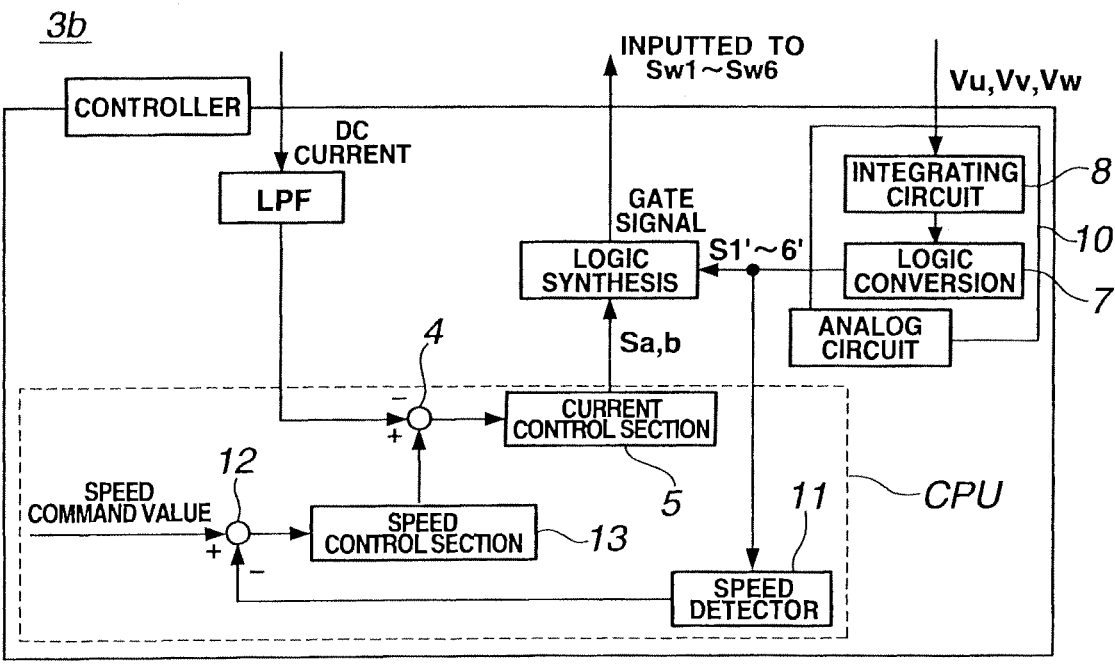
[FIG. 5] A configuration view showing a controller of an inverter control system in a second embodiment according to the present invention.

FIG. 5 is a block diagram showing a speed-control controller of an inverter control system in a second embodiment according to the present invention. Parts which are constructed in the same manner as the first embodiment are given same reference signs as those in the first embodiment, and the detailed explanations thereof will be omitted.

A structure of a main circuit in the second embodiment is the same as that of first embodiment. The inverter control system in the second embodiment includes the speed-control controller 3b in place of the current-control controller 3a of the first embodiment. Moreover, the input command in the second embodiment is a speed command value.

In the second embodiment, the 120-degree conduction patterns S1' to S6' outputted from the sensorless circuit 10 are converted into a speed detection value by a speed detector 11.

Next, a subtracting section 12 calculates a speed difference (deviation) between the speed detection value and the speed command value which denotes the input command. This speed difference is inputted to a speed control section 13, so that the current command value is produced. The remaining control (processing) of the second embodiment is the same as that of the first embodiment.

Accordingly, the inverter control system according to the second embodiment can perform a speed control of ultra high-speed motor. Moreover, operations and advantageous effects similar to those of the first embodiment can be obtained.

[Third Embodiment]

Figure 6:
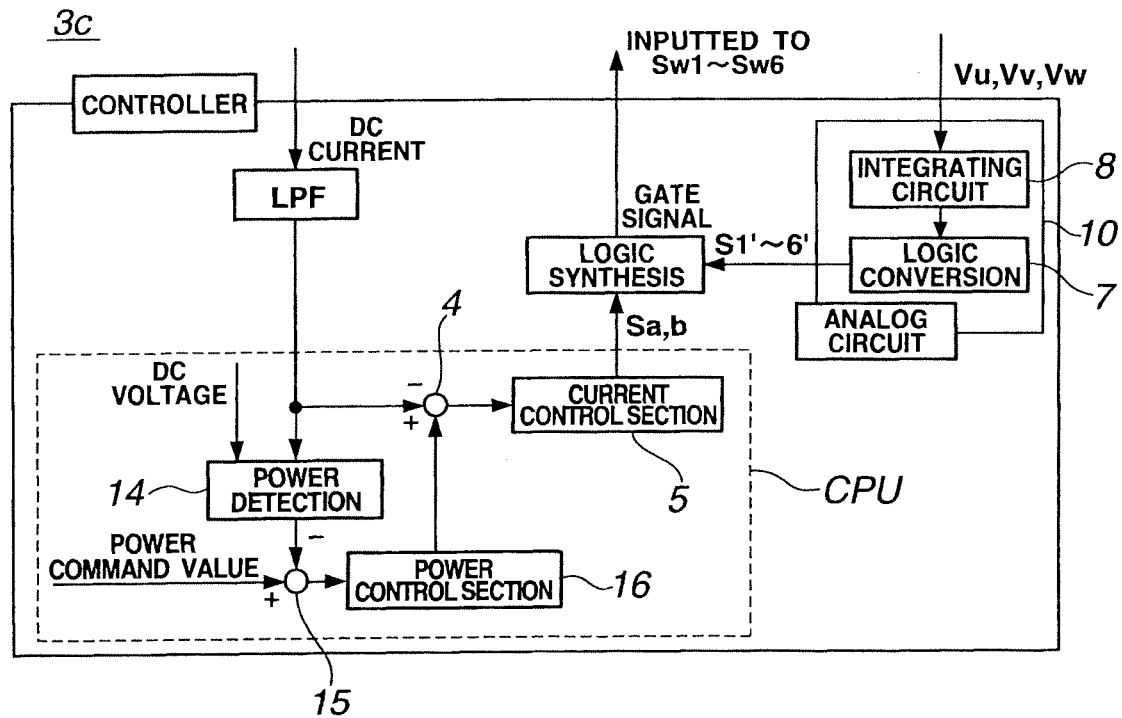
[FIG. 6] A configuration view showing a controller of an inverter control system in a third embodiment according to the present invention.

FIG. 6 is a block diagram showing an electric-power-control controller of an inverter control system in a third embodiment according to the present invention. Parts which are constructed in the same manner as the first embodiment are given same reference signs as those in the first embodiment, and the detailed explanations thereof will be omitted.

A structure of a main circuit in the third embodiment is the same as that of first embodiment. The inverter control system in the third embodiment includes the electric-power-control controller 3c in place of the current-control controller 3a of the first embodiment. Moreover, the input command in the third embodiment is an electric-power command value.

In the third embodiment, DC voltage value (a voltage between both ends of the smoothing condenser C, i.e., an input voltage to the inverter) is detected. An electric-power detector 14 multiplies this voltage detection value by the DC component of the current detection value outputted from the LPF, so that an electric-power detection value is calculated.

Next, a subtractor 15 calculates an electric-power difference (deviation) between the electric-power detection value and the electric-power command value which denotes the input command. This electric-power difference is inputted to an electric-power control section 16, so that the current command value is produced. The remaining control (processing) of the third embodiment is the same as that of the first embodiment.

Accordingly, the inverter control system according to the third embodiment can perform an electric-power control of ultra high-speed motor. Moreover, operations and advantageous effects similar to those of the first embodiment can be obtained.

[Fourth Embodiment]

Figure 7:
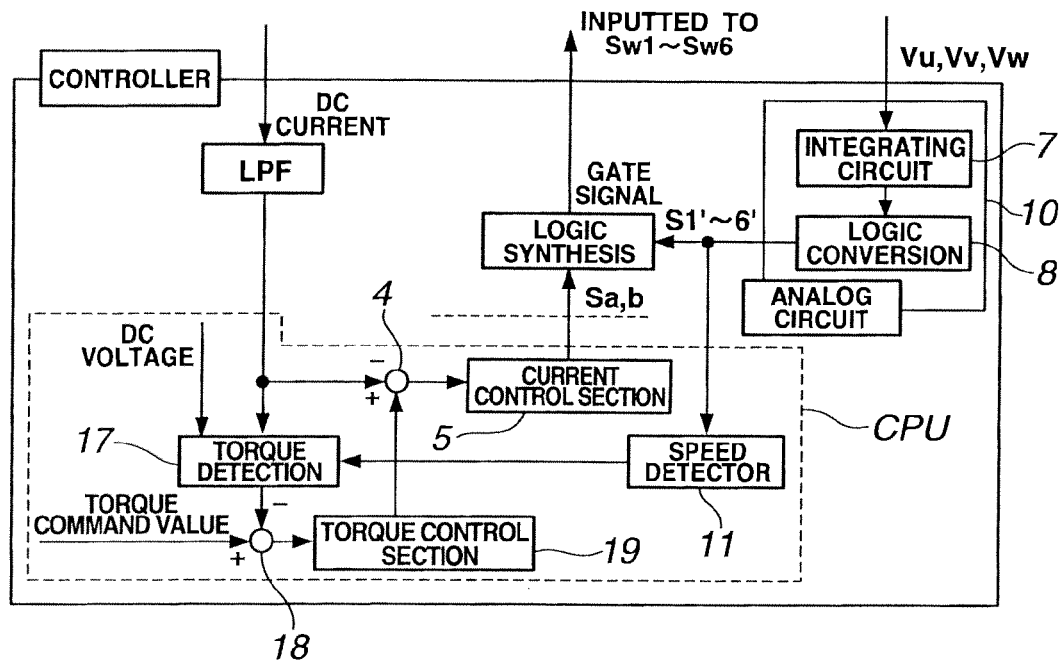
[FIG. 7] A configuration view showing a controller of an inverter control system in a fourth embodiment according to the present invention.
Figure 8:
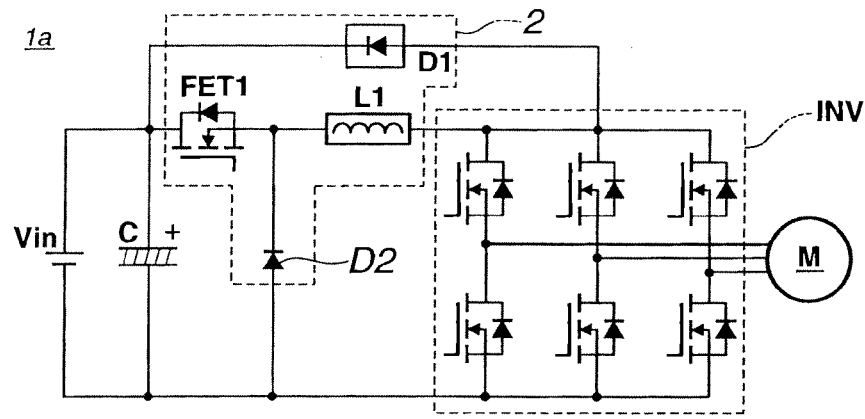
[FIG. 8] A configuration view showing a main circuit of a pseudo-current-source inverter in earlier technology.
Figure 9:
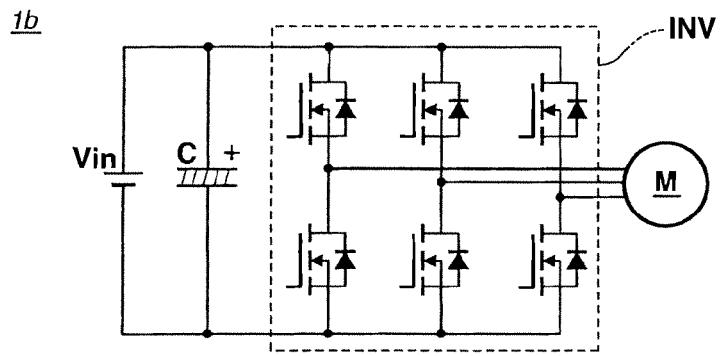
[FIG. 9] A configuration view showing a main circuit of a general voltage-source inverter.

FIG. 7 is a block diagram showing a torque-control controller of an inverter control system in a fourth embodiment according to the present invention. Parts which are constructed in the same manner as the first, second or third embodiment are given same reference signs as those in the first, second or third embodiment, and the detailed explanations thereof will be omitted.

A structure of a main circuit in the fourth embodiment is the same as that of first embodiment. The inverter control system in the fourth embodiment includes the torque-control controller 3d in place of the current-control controller 3a of the first embodiment. Moreover, the input command in the fourth embodiment is a torque command value.

In the fourth embodiment, the 120-degree conduction patterns S1' to S6' are converted into the speed detection value by the speed detector 11 in the same manner as in the second embodiment. Moreover, in the same manner as in the third embodiment, the DC voltage value (the input voltage to the inverter) is detected. A torque detector 17 calculates a torque detection value on the basis of the DC component of the current detection value outputted from the LPF, the voltage detection value, and the speed detection value.

Next, a subtractor 18 calculates a torque difference (deviation) between the torque detection value and the torque command value which denotes the input command. This torque difference is inputted to a torque control section 19, so that the current command value is produced. The remaining control (processing) of the fourth embodiment is the same as that of the first embodiment.

Accordingly, the inverter control system according to the fourth embodiment can perform a torque control of ultra high-speed motor. Moreover, operations and advantageous effects similar to those of the first embodiment can be obtained.

Only the above specific embodiments according to the present invention have been explained in detail. However, it is obvious to a person skilled in the art that various modifications and variations of the above embodiments can be done within technical ideas according to the present invention. As a matter of course, such modifications and variations are included in technical scopes of respective claims.

LIST OF REFERENCE SIGNS

1a~1c - - - Main circuit
3a~3c - - - Controller
4, 12, 15, 18 - - - Subtractor
5 - - - Current control section
7 - - - Integrating circuit
8 - - - Logic conversion section
9 - - - Logic synthesis section
10 - - - Sensorless circuit
11 - - - Speed detector
13 - - - Speed control section
14 - - - Electric-power detector
16 - - - Electric-power control section
17 - - - Torque detector
19 - - - Torque control section

What is claimed is:

1. An inverter control system comprising a controller configured to output a gate signal to a switching element provided in an inverter, the gate signal being produced based on an output terminal voltage of the inverter, an input current of the inverter and a current command value,
the controller including:
a low pass filter configured to extract a DC component from a current detection value of the input current of the inverter;
a subtracting section configured to calculate a current difference between the current command value and the DC component of the current detection value;
a current controller configured to produce two-phase PWM signals complementary to each other, from the current difference;
an integrating circuit configured to integrate the output terminal voltage of the inverter to convert the output terminal voltage into a magnetic-flux information;
a logic conversion section configured to convert the magnetic-flux information into a 120-degree conduction pattern to output the 120-degree conduction pattern; and
a logic circuit section configured to execute a logic synthesis between the two-phase PWM signals and the 120-degree conduction pattern to output the gate signal.

2. The inverter control system according to claim 1, wherein the controller further includes:
a speed detector configured to convert the 120-degree conduction pattern into a speed detection value;
a subtracting section configured to calculate a speed difference between the speed detection value and a speed command value which is an input command; and
a speed control section configured to calculate the current command value from the speed difference.

3. The inverter control system according to claim 1, wherein the controller further includes:
an electric-power detector configured to calculate an electric-power detection value by multiplying the DC component of the current detection value by a detection value of an input voltage of the inverter;
a subtracting section configured to calculate an electric-power difference between the electric-power detection value and an electric-power command value which is an input command; and
an electric-power control section configured to calculate the current command value from the electric-power difference.

4. The inverter control system according to claim 1, wherein the controller further includes:
a speed detector configured to convert the 120-degree conduction pattern into a speed detection value;
a torque detector configured to calculate a torque detection value from the DC component of the current detection value, the speed detection value and a detection value of an input voltage of the inverter;
a subtracting section configured to calculate a torque difference between the torque detection value and a torque command value which is an input command; and
a torque control section configured to calculate the current command value from the torque difference.

5. The inverter control system according to claim 1, wherein
the integrating circuit and the logic conversion section are constructed by an analog circuit.

* * * * *